(12) United States Patent
Knowles et al.

(10) Patent No.: US 11,993,148 B2
(45) Date of Patent: May 28, 2024

(54) COLD FORMED 3D PRODUCT AND PROCESSES USING VACUUM CHUCK

(71) Applicant: Corning Incorporated, Corning, NY (US)

(72) Inventors: Peter Knowles, Elmira, NY (US); Christopher Mark Schweiger, Painted Post, NY (US); Christopher Lee Timmons, Big Flats, NY (US); Arlin Lee Weikel, Mansfield, PA (US)

(73) Assignee: CORNING INCORPORATED, Corning, NY (US)

( * ) Notice: Subject to any disclaimer, the term of this patent is extended or adjusted under 35 U.S.C. 154(b) by 326 days.

(21) Appl. No.: 17/606,490

(22) PCT Filed: Apr. 21, 2020

(86) PCT No.: PCT/US2020/029058
§ 371 (c)(1),
(2) Date: Oct. 26, 2021

(87) PCT Pub. No.: WO2020/223056
PCT Pub. Date: Nov. 5, 2020

(65) Prior Publication Data
US 2022/0203835 A1 Jun. 30, 2022

Related U.S. Application Data

(60) Provisional application No. 62/840,237, filed on Apr. 29, 2019.

(51) Int. Cl.
*B60K 35/00* (2006.01)
*B60K 35/22* (2024.01)
(Continued)

(52) U.S. Cl.
CPC ............. *B60K 35/60* (2024.01); *B60K 35/22* (2024.01); *B60K 35/50* (2024.01);
(Continued)

(58) Field of Classification Search
CPC ............ B60K 37/02; B60K 2370/1526; B60K 2370/1523; B60K 2370/688;
(Continued)

(56) References Cited

U.S. PATENT DOCUMENTS

2019/0039935 A1 2/2019 Couillard et al.
2021/0109396 A1* 4/2021 Lee .................. G02F 1/133308
(Continued)

FOREIGN PATENT DOCUMENTS

CN 105938684 A * 9/2016 ............. B60K 35/00
DE 202013010582 U1 * 2/2014 ............. B60K 35/00
(Continued)

OTHER PUBLICATIONS

Description Translation for KR 102337341 from Espacenet (Year: 2021).*
Description Translation for WO 2020/092060 from Espacenet (Year: 2020).*
International Search Report and Written Opinion of the International Searching Authority; PCT/US2020/029058; dated Jul. 16, 2020; 10 pages; European Patent Office.

*Primary Examiner* — Jason D Shanske
*Assistant Examiner* — Daniel M. Keck

(57) ABSTRACT

The disclosure relates to vacuum forming methods, apparatuses and resulting displays that represent improvements in various key areas. The methods, for example, greatly improve manufacturing throughput through reduced curing times. The methods further facilitate improved control of glass shape to a targeted shape and improved control of bond line thickness, which result in improved survivability and long-term reliability, for example.

15 Claims, 10 Drawing Sheets

(51) Int. Cl.
  *B60K 35/50* (2024.01)
  *B60K 35/60* (2024.01)
  *G02F 1/1333* (2006.01)
(52) U.S. Cl.
  CPC .............. *B60K 2360/1526* (2024.01); *B60K 2360/688* (2024.01); *B60K 2360/691* (2024.01); *B60K 2360/692* (2024.01); *B60K 2360/693* (2024.01); *B60K 2360/774* (2024.01); *B60K 2360/816* (2024.01); *B60K 2360/92* (2024.01); *B60K 2360/96* (2024.01); *B60Y 2200/11* (2013.01)
(58) Field of Classification Search
  CPC ........ B60K 2370/691; B60K 2370/692; B60K 2370/693; B60K 2370/774; B60K 2370/816; B60K 2370/91; B60K 2370/98; B60K 37/04; B60K 35/00; B60Y 2200/11; G02F 1/133308; G02F 1/133331
  See application file for complete search history.

(56) References Cited

U.S. PATENT DOCUMENTS

| | | | |
|---|---|---|---|
| 2023/0063933 A1* | 3/2023 | Yamazaki | G09G 3/3225 |
| 2023/0099374 A1* | 3/2023 | Hong | H10K 59/352 |
| | | | 257/91 |
| 2024/0051395 A1* | 2/2024 | Irzyk | B60K 35/60 |

FOREIGN PATENT DOCUMENTS

| | | | | |
|---|---|---|---|---|
| DE | 102015203675 A1 | * | 9/2016 | |
| DE | 102016218916 A1 | | 3/2018 | |
| EP | 3731004 A1 | * | 10/2020 | ....... G02F 1/133308 |
| JP | 2013-188993 A | | 9/2013 | |
| KR | 102337341 B1 | * | 12/2021 | |
| WO | 2019/055667 A1 | | 3/2019 | |
| WO | 2020/092060 A1 | | 5/2020 | |

* cited by examiner

US 11,993,148 B2

COLD FORMED 3D PRODUCT AND PROCESSES USING VACUUM CHUCK

CROSS-REFERENCE TO RELATED APPLICATIONS

This application is a national stage application under 35 U.S.C. § 371 of International Application No. PCT/US2020/029058, filed on Apr. 21, 2020, which claims the benefit of priority under 35 U.S.C. § 119 of U.S. Provisional Application Ser. No. 62/840,237 filed on Apr. 29, 2019 the content of which is relied upon and incorporated herein by reference in its entirety.

BACKGROUND

Vehicle interiors can include curved surfaces that incorporate displays and/or touch panels. The materials used to form such curved surfaces are typically limited to polymers, which do not exhibit the durability and optical performance of glass. As such, curved glass substrates are desirable, especially when used as covers for displays and/or touch panels. Existing methods of forming curved glass substrates, such as thermal forming, have drawbacks including high cost, and optical distortion and/or surface marking occurring during curving or shaping. Accordingly, there is a need for vehicle interior systems that can incorporate a curved glass substrate in a cost-effective manner and without the problems typically associated with glass thermal forming processes. However, current cold forming methods have various drawbacks including that an adhesive layer is subject to both shear and tensile stress in some instances and/or do not readily allow for the rapid manufacturing throughput.

SUMMARY

The disclosure provides, among other things, cold formed 3D products such as curved glass substrates for surfaces in a vehicle interior. In addition, the methods and apparatuses of forming such curved glass substrates provide for improved control of glass shape to a targeted shape, improved control of bond line thickness, significantly reduced process times, are flexible to multiple designs and bond line thicknesses are compatible with all types of displays including laminated displays.

DESCRIPTION OF THE DRAWINGS

The drawings illustrate generally, by way of example, but not by way of limitation, various embodiments discussed herein.

Figure 1:
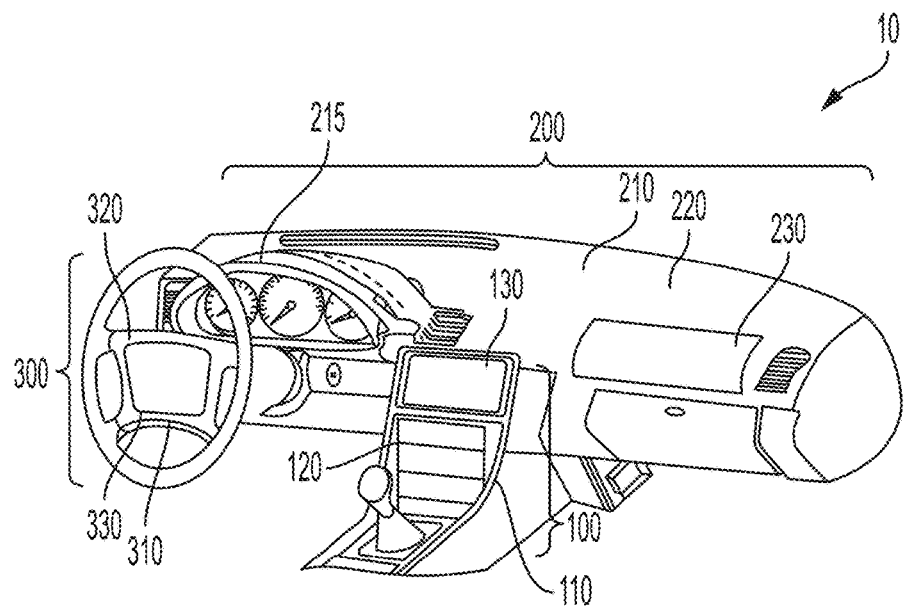
FIG. 1 is a perspective view illustration of a vehicle interior with vehicle interior systems according to one or more embodiments.

Repeated use of reference characters in the specification and drawings is intended to represent the same or analogous features or elements of the disclosure, even when the numbers increase by 100 from figure-to-figure. It should be understood that numerous other modifications and examples can be devised by those skilled in the art, which fall within the scope and spirit of the principles of the disclosure.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Cold forming (e.g., bending) is an energy efficient method of creating curved glass substrates based on the elastic deformation of glass at relatively low temperature (e.g., <140° C.) with the application of out of plane loads to create the desired shape. During the cold forming process, a flat high-strength glass substrate is three-dimensionally (3D) deformed and mechanically fixed by an adhesive interlayer to a target pre-formed 3D frame to which, e.g., display functional modules are mounted.

This disclosure provides vacuum forming methods, apparatuses and resulting displays that represent improvements in various key areas. The methods, for example, greatly improve manufacturing throughput through reduced curing times. The methods further facilitate improved control of glass shape to a targeted shape and improved control of bond line thickness, which result in improved survivability and long-term reliability, for example.

Vehicle interior systems may include a variety of different curved surfaces that are designed to be transparent, such as curved display surfaces, and the present disclosure provides articles and methods for forming these curved surfaces which include a glass substrate. Displays for vehicle interior systems are generally equipped with a frame that allows display components to be easily viewed when the display is on but can contrast the color or pattern of the display to adjacent automotive interior components.

As used herein, the terms "cold-formed," "cold-bent," or "cold-bending" refers to curving the glass substrate at a cold-forming temperature which is less than the softening point of the glass. The term "cold-bendable" refers to the capability of a glass substrate to be cold-bent.

FIG. 1 shows a vehicle interior 10 that includes three different vehicle interior systems 100, 200, 300, according to an exemplary embodiment. Vehicle interior system 100 includes a center console base 110 with a curved surface 120 including a display, shown as curved display 130. Vehicle interior system 200 includes a dashboard base 210 with a curved surface 220 including a display, shown curved display 230. The dashboard base 210 typically includes an instrument panel 215 which may also include a curved display. Vehicle interior system 300 includes a dashboard steering wheel base 310 with a curved surface 320 and a display, shown as a curved display 330. In one or more embodiments, the vehicle interior system may include a base that is an arm rest, a pillar, a seat back, a floor board, a headrest, a door panel, or any portion of the interior of a vehicle that includes a curved surface.

The articles and techniques described herein can be used in any or all of vehicle interior systems 100, 200 and 300. While FIG. 1 shows an automobile interior, the various embodiments of the vehicle interior system may be incorporated into any type of vehicle such as trains, automobiles (e.g., cars, trucks, buses and the like), sea craft (boats, ships, submarines, and the like), and aircraft (e.g., drones, airplanes, jets, helicopters and the like), including both human-piloted vehicles, semi-autonomous vehicles and fully autonomous vehicles.

Figure 2A:
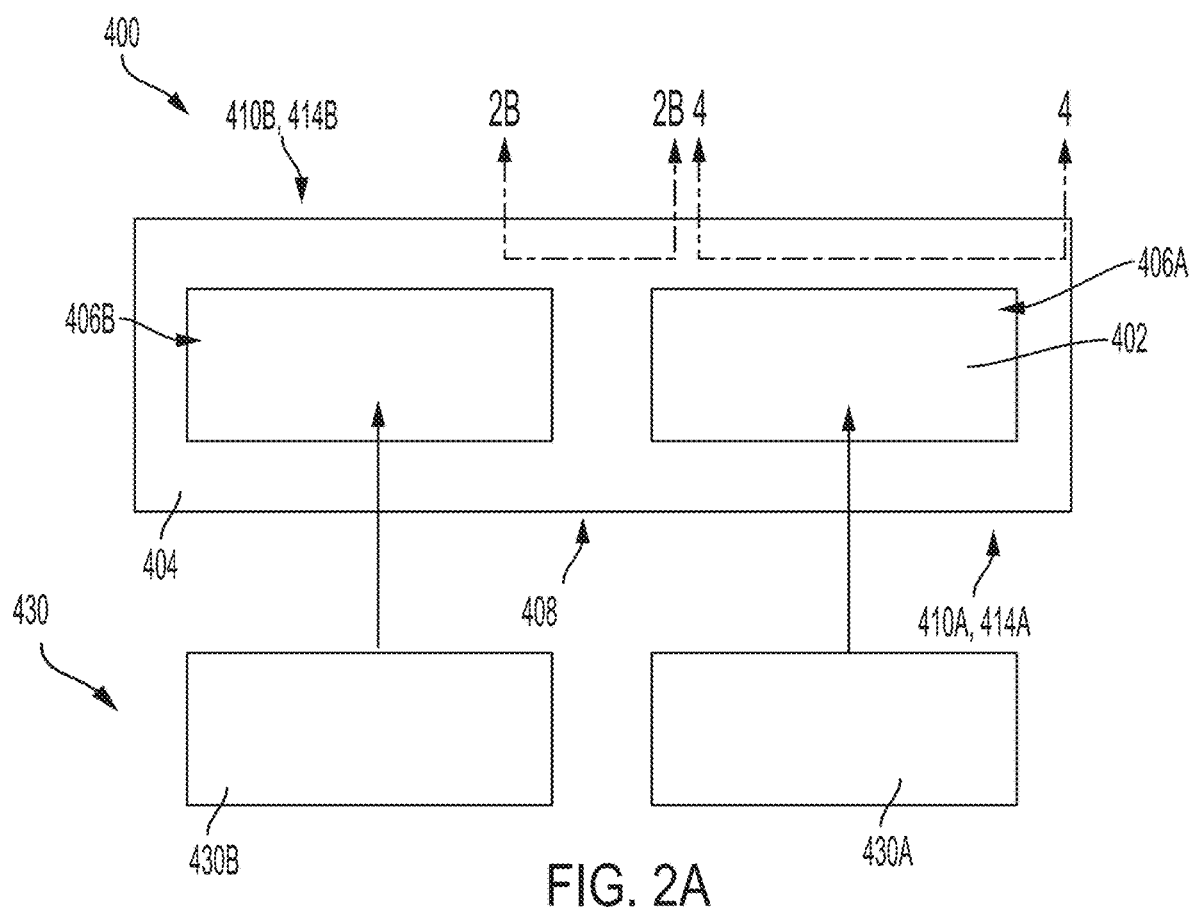
FIG. 2A is a top view illustration of a display including a curved glass substrate and frame.

FIG. 2A shows a display 400 for a vehicle interior system according to one embodiment. The display 400 is an apparatus for housing a plurality of display modules 430. A method and apparatus for forming the display 400 are further discussed in reference to FIGS. 6A-8. It should be recognized that the techniques and apparatus of FIGS. 6A-8 are not limited to the display 400 but to any display including those of FIG. 1. As shown in both FIGS. 2 and 2A, the display 400 includes a glass substrate 402, and a frame 404. As shown only in FIG. 2, the frame 404 includes a first opening 406A and a second opening 406B configured to house further display components or modules (not shown). The frame 404 includes a curved central portion 408 (also shown in the cross-section of FIG. 2A), a first wing portion 410A and a second wing portion 410B. Similarly, the glass substrate 402 can include a curved central portion 412 (also shown in the cross-section of FIG. 2A), a first wing portion 414A and a second wing portion 414B.

As shown in FIG. 2, the first wing portion 410A can be connected to a first side of the central portion 408 and can define the first opening 406A configured to receive a first one 430A of the plurality of display modules 430 therein. Similarly, the second wing portion 410B can be connected to an opposing second side of the central portion 408 and can define the second opening 406B configured to receive a second one 430B of the plurality of display modules 430 therein.

The glass substrate 402 can be comprised of suitable glass compositions for use in the cold-formed glass substrates described herein include soda lime glass, aluminosilicate glass, borosilicate glass, boroaluminosilicate glass, alkali-containing aluminosilicate glass, alkali-containing borosilicate glass, and alkali-containing boroaluminosilicate glass.

The glass substrate 402 can be strengthened using any suitable method known in the art, including by including compressive stress (CS) into the glass substrate, that extends from a surface to a depth of compression (DOC); by utilizing a mismatch of the coefficient of thermal expansion between portions of the article to create a compressive stress region and a central region exhibiting a tensile stress; thermally by heating the glass to a temperature above the glass transition point and then rapidly quenching; and chemically by ion exchange, where, e.g., ions at or near the surface of the glass substrate are replaced by, or exchanged with, larger ions having the same valence or oxidation state.

As used herein, the term "glass substrate" is used in its broadest sense to include any object made wholly or partly of glass. Glass substrates include laminates of glass and non-glass materials, laminates of glass and crystalline materials, and glass-ceramics (including an amorphous phase and a crystalline phase). The glass substrate may be transparent or opaque. Cold-formed glass substrate can include a colorant that provides a specific color.

Figure 2B:
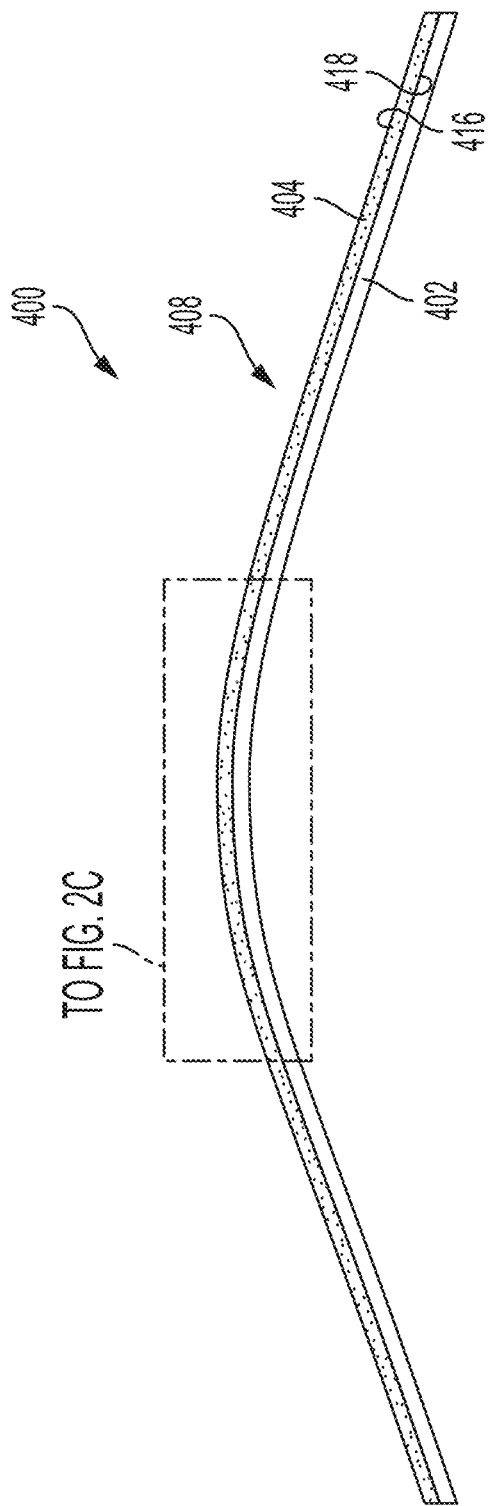
FIG. 2B is a cross-sectional view through a curved portion of the display of FIG. 2A.

The glass substrate 402 can be positioned on the frame 404 and can include the curved central portion 412 interfacing with and generally conforming to the curved central portion 408 of the frame 404. The first wing portion 414A of the glass substrate 402 can interface with and generally conform to the first wing portion 410A of the frame 404. The second wing portion 414B of the glass substrate 402 can interface with and generally conform to the second wing portion 410B of the frame 404. The glass substrate 402 in the wing portions 414A, 414B can cover the first and second openings 406A and 406B. FIG. 2B shows the interface between the glass substrate 402 and the frame 404. This occurs along a first major surface 416 of the glass substrate 402 and a first major surface 418 of the frame 404.

The frame 404 has an interior surface that defines the first opening 406A and a second interior edge defines the second opening 406B. The first interior surface provides mechanical alignment for positioning the first of the plurality of display modules within the first opening 406A and the second interior surface provides mechanical alignment for positioning the second of the plurality of display modules within the second opening 406B.

Figure 2C:
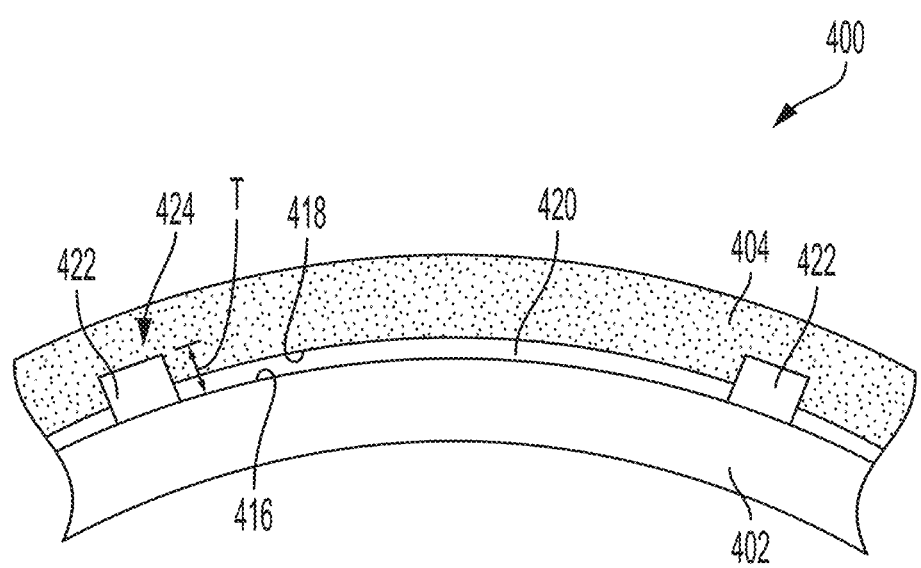
FIG. 2C is an enlarged view of a portion of the cross-sectional view of FIG. 2B further showing bonding medium and spacer.

FIG. 2C further shows an enlargement of the cross-section of FIG. 2B showing a bonding medium 420 attaching the glass substrate 502 to the frame 404 at the first major surfaces 416 and 418. This bonding medium 420 can comprise a structural adhesive according to one embodiment. The structural adhesive can include polyurethanes (e.g., DP604NS available from 3M®, Saint Paul, MN, as well as Betamate 73100/002, 73100/005, 73100/010, Betaseal X2500, and Betalink K2, from Dupont®, Wilmington, DE), polysiloxanes and silane-modified polymers (e.g., TEROSON RB IX, also known as TEROSTAT MS 9399 and TEROSON MS 647, available from Loctite®), and epoxies (e.g., Scotch-Weld™ Epoxy Adhesive DP125 and DP604 available from 3M®, Saint Paul, MN).

Additional adhesives include, but not limited to, an adhesive selected from one of more of the categories: (a) Toughened Epoxy (for example, Masterbond EP21TDCHT-LO, 3M Scotch Weld Epoxy DP460 Off-white); (b) Flexible Epoxy (for example, Masterbond EP21TDC-2LO, 3M Scotch Weld Epoxy 2216); (c) Acrylics and/or Toughened Acrylics (for example, LORD Adhesive 403, 406 or 410 Acrylic adhesives with LORD Accelerator 19 or 19GB w/LORD AP 134 primer, LORD Adhesive 850 or 852/LORD Accelerator 25GB, Loctite HF8000, Loctite AA4800); (d) Urethanes (for example, 3M Scotch Weld Urethane DP640 Brown, SikaForce 7570 L03, SikaForce 7550 L15, Sikaflex 552 and Polyurethane (PUR) Hot Melt adhesives such as, Technomelt PUR 9622-02 UVNA, Loctite HHD 3542, Loctite HHD 3580, 3M Hotmelt adhesives 3764 and 3748); and (e) Silicones (Dow Corning 995, Dow Corning 3-0500 Silicone Assembly adhesive, Dow Corning 7091, SikaSil-GP). In some cases, structural adhesives available as sheets or films (for example, but not limited to, 3M Structural adhesive films AF126-2, AF 163-2M, SBT 9263 and 9214, Masterbond FLM36-LO) may be utilized. Furthermore, pressure sensitive adhesives such as 3M VHB tapes may be utilized. In such embodiments, utilizing a pressure sensitive adhesive allows for the curved glass substrate to be bonded to the frame without the need for, among other things, a curing step As shown in FIG. 2C, the bonding medium can contain a rigid, semi-rigid or compliant spacer 422 of material different from the structural adhesive or other bonding medium 420 and/or different thickness T. In other embodiments the spacer 422 can be of same material as the structural adhesive or other bonding medium 420 but can have a different thickness T as shown. The spacer 422 can be used in critical stress areas to prevent glass compression prior to full curing of the structural adhesive, for example. The spacer 422 can be a feature separate from the structural adhesive for example. The spacer 422 can be any one of or a combination of VHB tape, foam tape, pre-cured adhesive dots, rigid polymer, compliant polymer or fully or partially cured structural adhesive (cured fully or partially prior to the remainder of the bonding medium 420). The spacer 422 can be applied to the glass and/or frame. In regions of the display that utilize the spacer 422, the frame 404 can have mechanical features 424 such as grooves, ridges, etc. to improve alignment or performance of the spacer 422, for example. Spacers 422 could be sacrificial or permanent. Sacrificial spacers 422 could be replaced with structural adhesive later.

Figure 3:
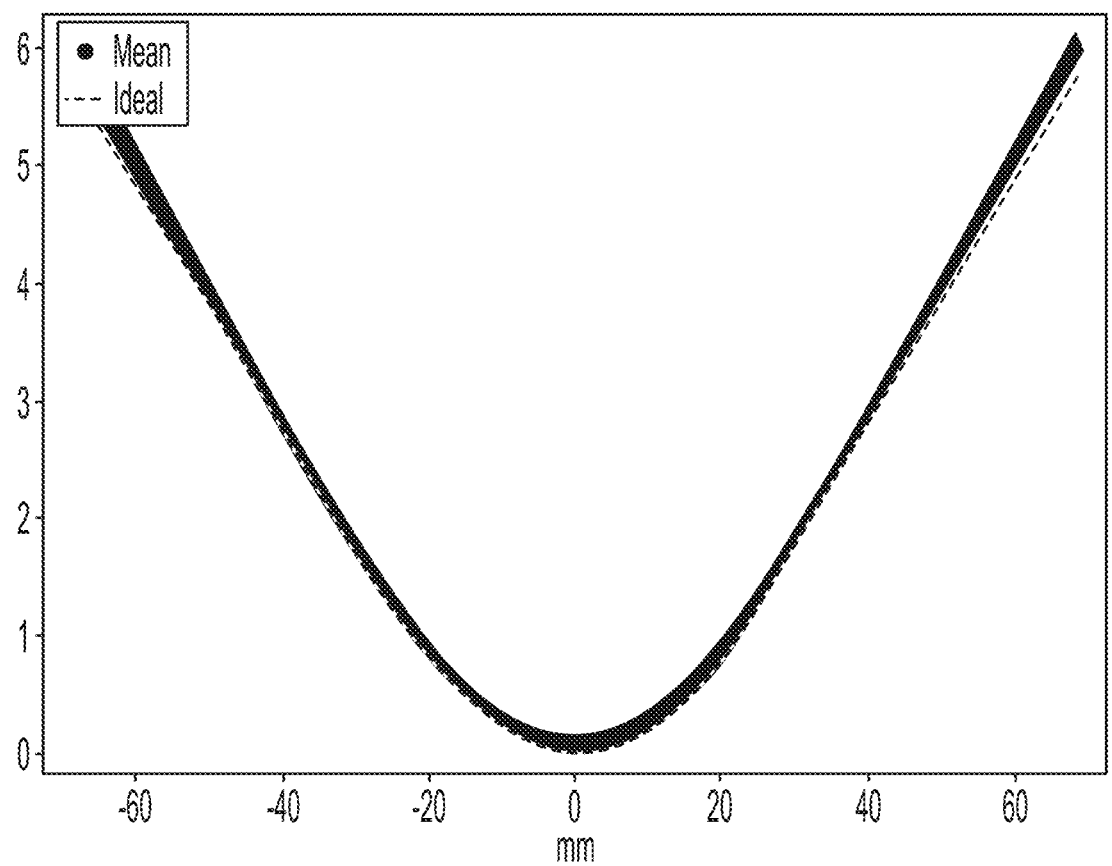
FIG. 3 is a graphical comparison of glass shape cross-sectional thickness in the curved center region of the display of FIGS. 2A and 2B with a target curvature.

According to the embodiment of FIG. 2C (and as shown in the graphs of FIGS. 3 and/or 9), the bonding medium 420 can have a thickness between the glass and the frame that varies between +/−200 μm or 10% of a desired thickness, whichever is less. This is a direct result of the method and apparatus for forming the display 400 that are further discussed in reference to FIGS. 6A-8 for reasons that will be discussed further subsequently. Exemplary thicknesses for the bonding medium 420 can be 3 mm, 2 mm, 1 mm, 0.5 mm, 0.25 mm, 0.01 mm, or less and may be applied in a variety of ways. In one embodiment, the adhesive is applied using an applicator gun and mixing nozzle or premixed syringes or robotic adhesive dispenser, and spread uniformly using any of the following, for example, a roller, a brush, a doctor blade or a draw down bar The bonding medium 420 can also have any suitable length and/or width. For example, one of the width and/or length can be about 25 mm or less. The length and/or width in a range from about 1 mm to about 15 mm, from about 5 mm to about 20 mm, from about 10 mm to about 15 mm, from about 1 mm to about 10 mm, from about 5 mm to about 10 mm, from about 5 mm to about 15 mm, from about 10 mm to about 20 mm, or from about 1 mm to about 5 mm.

The bonding medium 420 can have any suitable thickness, measured from a surface of the bonding medium 420 that contacts the glass substrate 420 to the frame 404. The thickness of the bonding medium 420 can be tailored to, among other things, ensure lamination between the frame 404 and the cold-formed glass substrate 402. For example, the bonding medium 420 may have a thickness of about 5 mm or less. The bonding medium 420 can have a thickness in a range from about 200 μm to about 500 μm, from about 225 μm to about 500 μm, from about 250 μm to about 500 μm, from about 275 μm to about 500 μm, from about 300 μm to about 500 μm, from about 325 μm to about 500 μm, from about 350 μm to about 500 μm, from about 375 μm to about 500 μm, from about 400 μm to about 500 μm, from about 200 μm to about 475 μm, from about 200 μm to about 450 μm, from about 200 μm to about 425 μm, from about 200 μm to about 400 μm, from about 200 μm to about 375 μm, from about 200 μm to about 350 μm, from about 200 μm to about 325 μm, from about 200 μm to about 300 μm, or from about 225 μm to about 275 μm.

The thickness of the glass substrate 402 can be tailored to allow the glass substrate to be more flexible to achieve the desired radius of curvature. Moreover, a thinner glass substrate 402 may deform more readily, which could potentially compensate for shape mismatches and gaps that may be created by the shape of the display 400 (when curved). The glass substrate 402 and at least a portion of the frame 404 can have substantially similar radii of curvature to provide a substantially uniform distance between the first major surface 416 and the first major surface 418, which can be filled with the bonding medium 420 and/or spacer 422.

Returning now to FIG. 2B, a radius of curvature of the curved central portion 408 of the frame 404 and/or a radius of curvature of the curved central portion 412 of the glass substrate 402 can be, for example, about 20 mm or greater, 40 mm or greater, 50 mm or greater, 60 mm or greater, 100 mm or greater, 250 mm or greater or 500 mm or greater. For example, the first radius of curvature may be in a range from about 20 mm to about 2000 mm, from about 30 mm to about 2000 mm, from about 40 mm to about 1500 mm, from about 50 mm to about 1500 mm, 60 mm to about 1500 mm, from about 70 mm to about 2000 mm, from about 80 mm to about 1500 mm, from about 90 mm to about 2000 mm, from about 100 mm to about 2000 mm, from about 120 mm to about 2000 mm, from about 140 mm to about 2000 mm, from about 150 mm to about 2000 mm, from about 160 mm to about 2000 mm, from about 180 mm to about 2000 mm, from about 200 mm to about 2000 mm, from about 220 mm to about 2000 mm, from about 240 mm to about 2000 mm, from about 250 mm to about 2000 mm, from about 260 mm to about 2000 mm, from about 270 mm to about 2000 mm, from about 280 mm to about 2000 mm, from about 290 mm to about 2000 mm, from about 300 mm to about 2000 mm, from about 350 mm to about 2000 mm, from about 400 mm to about 2000 mm, from about 450 mm to about 2000 mm, from about 500 mm to about 2000 mm, from about 550 mm to about 2000 mm, from about 600 mm to about 2000 mm, from about 650 mm to about 2000 mm, from about 700 mm to about 2000 mm, from about 750 mm to about 2000 mm, from about 800 mm to about 2000 mm, from about 900 mm to about 2000 mm, from about 950 mm to about 2000 mm, from about 1000 mm to about 2000 mm, from about 1250 mm to about 2000 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In one or more embodiments, glass substrates having a thickness of less than about 0.4 mm may exhibit a radius of curvature that is less than about 100 mm, or less than about 60 mm. According to one embodiment, the curved central portion of the frame and the curved central portion of the glass substrate each have a radius of curvature of 20 mm but less than 500 mm.

As shown in FIG. 3, the radius of curvature of the curved central portion 412 of the glass substrate 402 can be within 100 μm of the radius of curvature of the curved central portion 408 of the frame 404. This is a direct result of the method and apparatus for forming the display 400 are further discussed in reference to FIGS. 6A-8 for reasons that will be discussed further subsequently. In brief, two of the key parameters for glass formed parts are the glass shape and the bond thickness. Often the overall part thickness is a surrogate for the bond line as the glass and frame thickness are relatively consistent. FIG. 3 indicates the cross section of the curved region of the display 400. The solid (blue) line is cross section, with thickness of the line indicative of the bond medium 420 variation. The dashed (red) line is a target shape. Parts made on the vacuum chuck of FIGS. 6A-8 closely conform to the target within 100 μm. This should be contrasted with conventional methods/apparatuses where parts were off shape target by more than 1 mm.

The frame 404 can have any suitable thickness. For example, the metal substrate thickness can be in a range from about 0.5 mm to about 20 mm (e.g., from about 2 mm to about 20 mm, from about 3 mm to about 20 mm, from about 4 mm to about 20 mm, from about 5 mm to about 20 mm, from about 6 mm to about 20 mm, from about 7 mm to about 20 mm, from about 8 mm to about 20 mm, from about 9 mm to about 20 mm, from about 10 mm to about 20 mm, from about 12 mm to about 20 mm, from about 14 mm to about 20 mm, from about 1 mm to about 18 mm, from about 1 mm to about 16 mm, from about 1 mm to about 15 mm, from about 1 mm to about 14 mm, from about 1 mm to about 12 mm, from about 1 mm to about 10 mm, from about 1 mm to about 8 mm, from about 1 mm to about 6 mm, from about 1 mm to about 5 mm, from about 1 mm to about 4 mm, from about 1 mm to about 3 mm, from about 1 mm to about 2 mm, and all ranges and sub-ranges therebetween.

Figure 4:
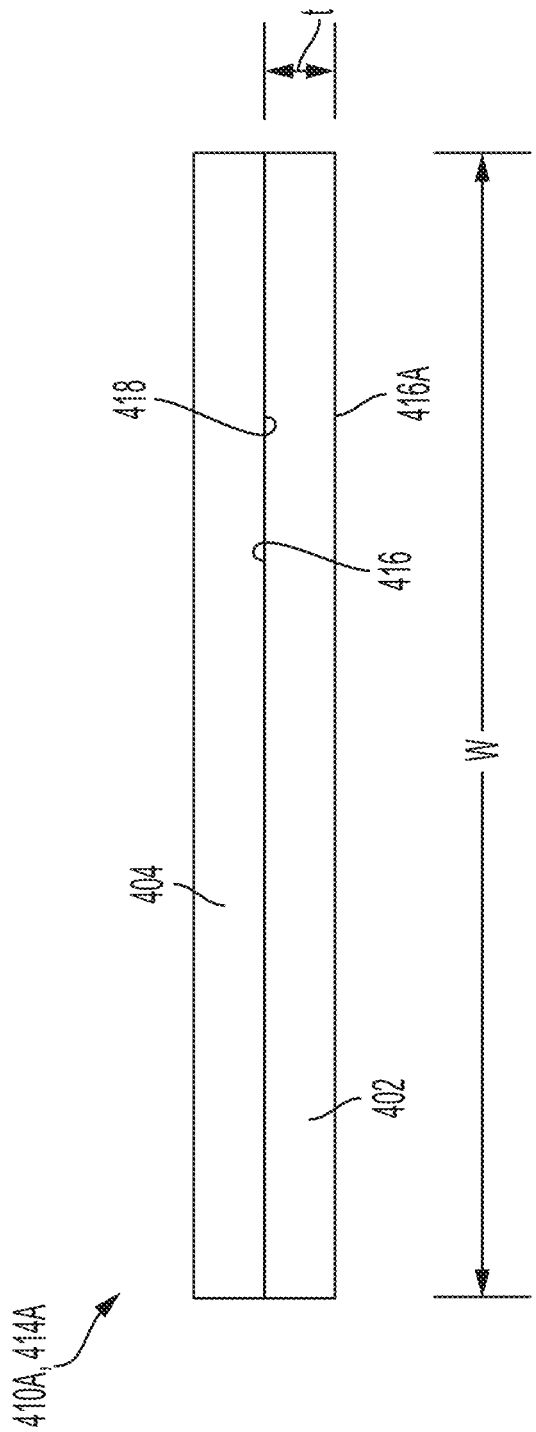
FIG. 4 is a cross-sectional view of the display of FIG. 2A taken in one of the wing regions.

As shown in FIG. 4, which is a cross-section of FIG. 2A in the first wing region 410A, 414A the glass substrate 402 has a thickness (t) that is substantially constant and is defined as a distance between the first major surface 416 and a second major surface 416A. The thickness (t) as used herein refers to the maximum thickness of the glass substrate. As shown in FIG. 4, the glass substrate includes a width (W) defined as a first maximum dimension of one of the first or second major surfaces 416, 416A and 418 orthogonal to the thickness (t), and a length (now shown due to cross-sectional nature of FIG. 4) defined as a second maximum dimension of one of the first or second surfaces 416, 416A, 418 orthogonal to both the thickness and the width. The dimensions discussed herein can be average dimensions. The bonding medium is not specifically shown in FIG. 4.

The glass substrate 402 can have any suitable thickness. For example, can have a thickness (t) that is about 1.5 mm or less. For example, the thickness may be in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

The glass substrate 402 can also have the width (w) and/or length (not specifically shown) in a range from about 5 cm to about 250 cm, from about 30 cm to about 90 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

Figure 5:
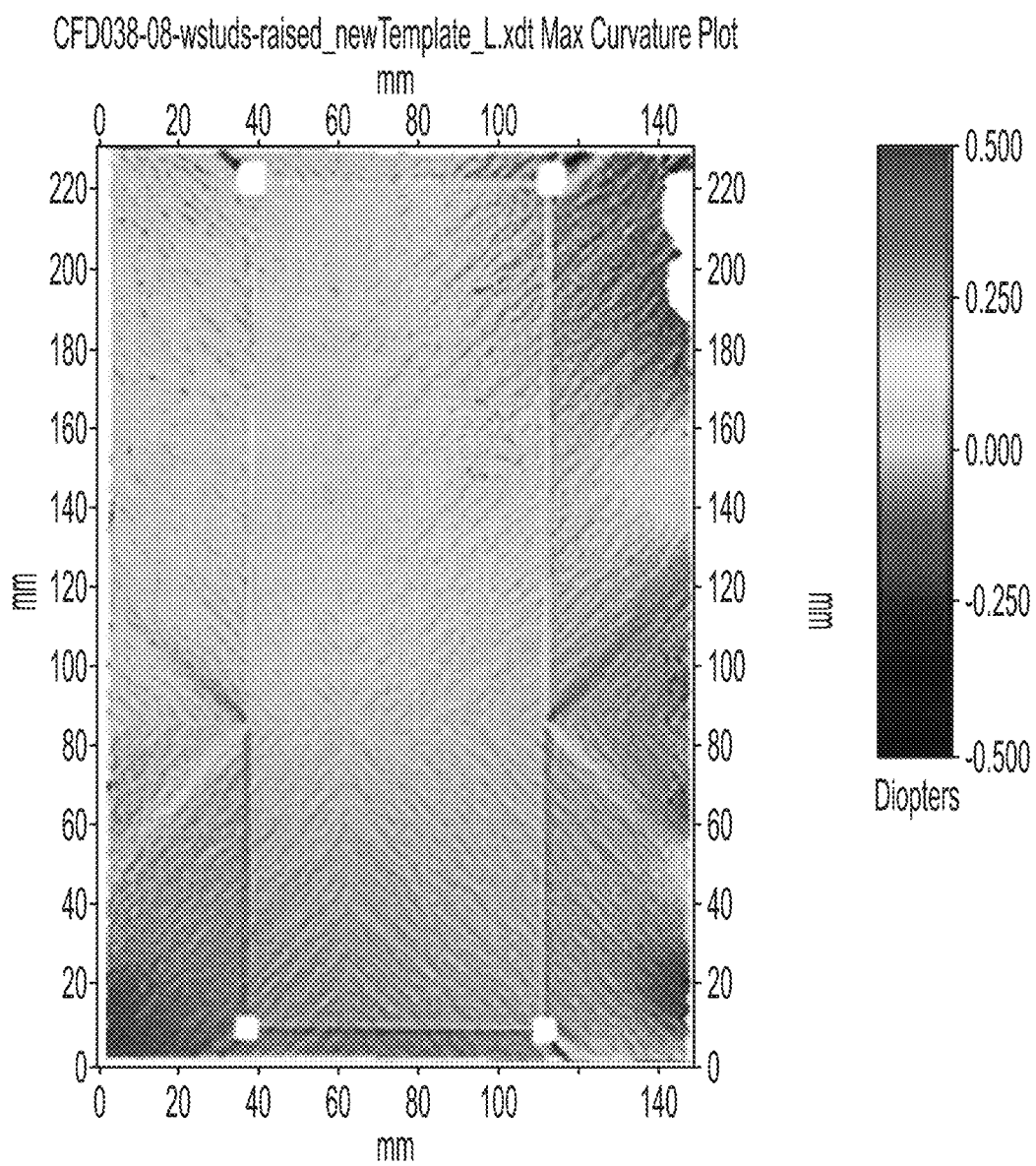
FIG. 5 shows a relative flatness of the display including the frame and glass substrate in the wing section of FIG. 4.

FIG. 5 illustrates an example flatness of the glass substrate 402 and the frame 404 in the first wing region 410A, 414A. This flatness is particularly important along the first major surface 416, 418 interface to improve display visibility and reduce mechanical stresses that can cause premature failure. This improved flatness of the first major surface 416 relative to the first major surface 418 is a direct result of the method and apparatus for forming the display 400 that are further discussed in reference to FIGS. 6A-8 for reasons that will be discussed further subsequently.

As shown in FIG. 5, the flatness of the display 400 in a display region such as along the first wing portion 410A, 414A and in particular at the first opening 406A is illustrated. FIG. 5 shows an image collected by deflectometry with local curvature in units of Diopter, where non-zero Diopter values indicate curvature. Increasing Diopter indicate larger local curvature. As shown in FIG. 5, clamping for at least 2 hours results in the flattest display region to improve optical performance. Thus, as illustrated in FIG. 5, one or more of the first wing portion of the glass, the first wing portion of the frame, the second wing portion of the glass and the second wing portion of the frame each have at least one surface a curvature that varies by +/−0.250, +/− 0.150, +/− 0.100 units of Diopter. Target local curvature can be between 0 (substantially flat) and 2 units Diopter.

Figure 6A:
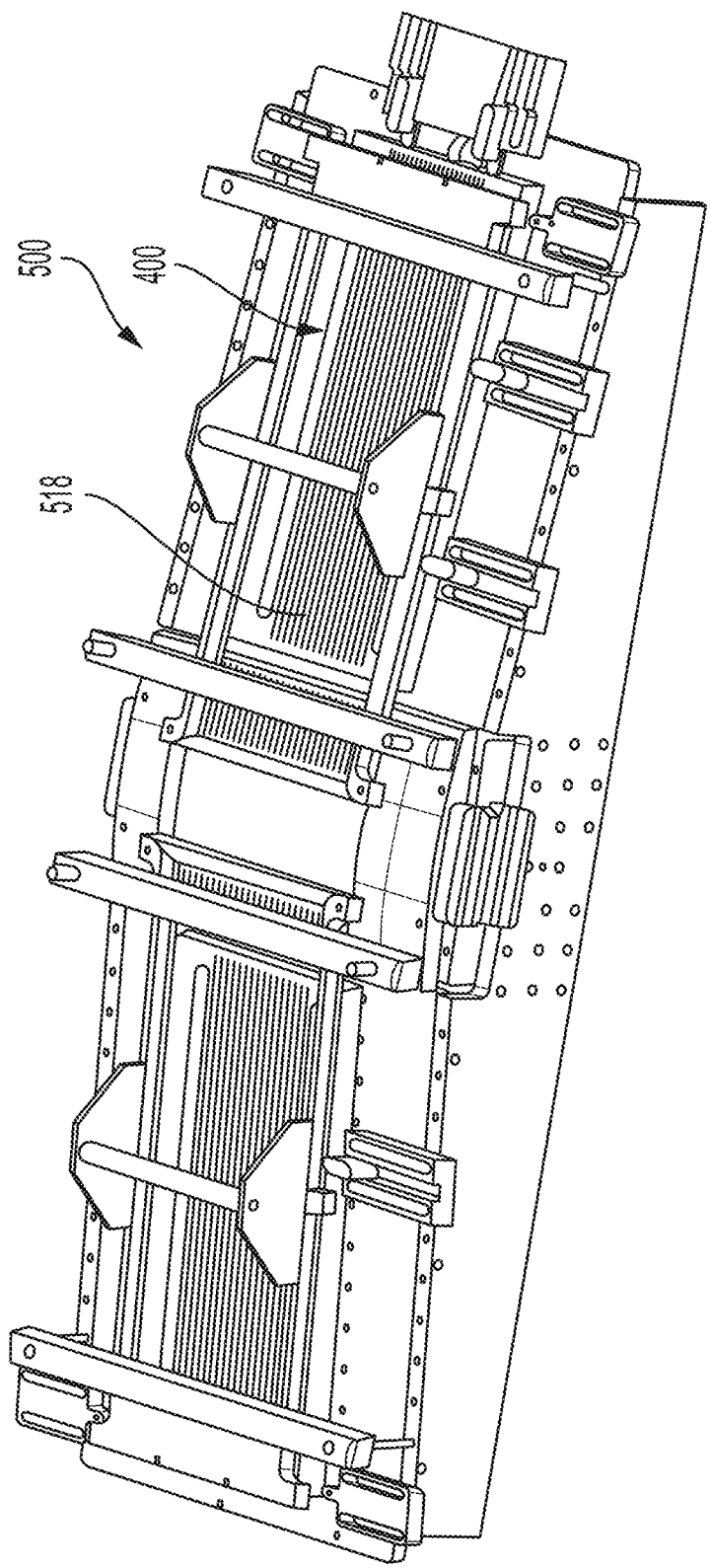
FIGS. 6A and 6B show a vacuum forming apparatus according to one exemplary embodiment.
Figure 6B:
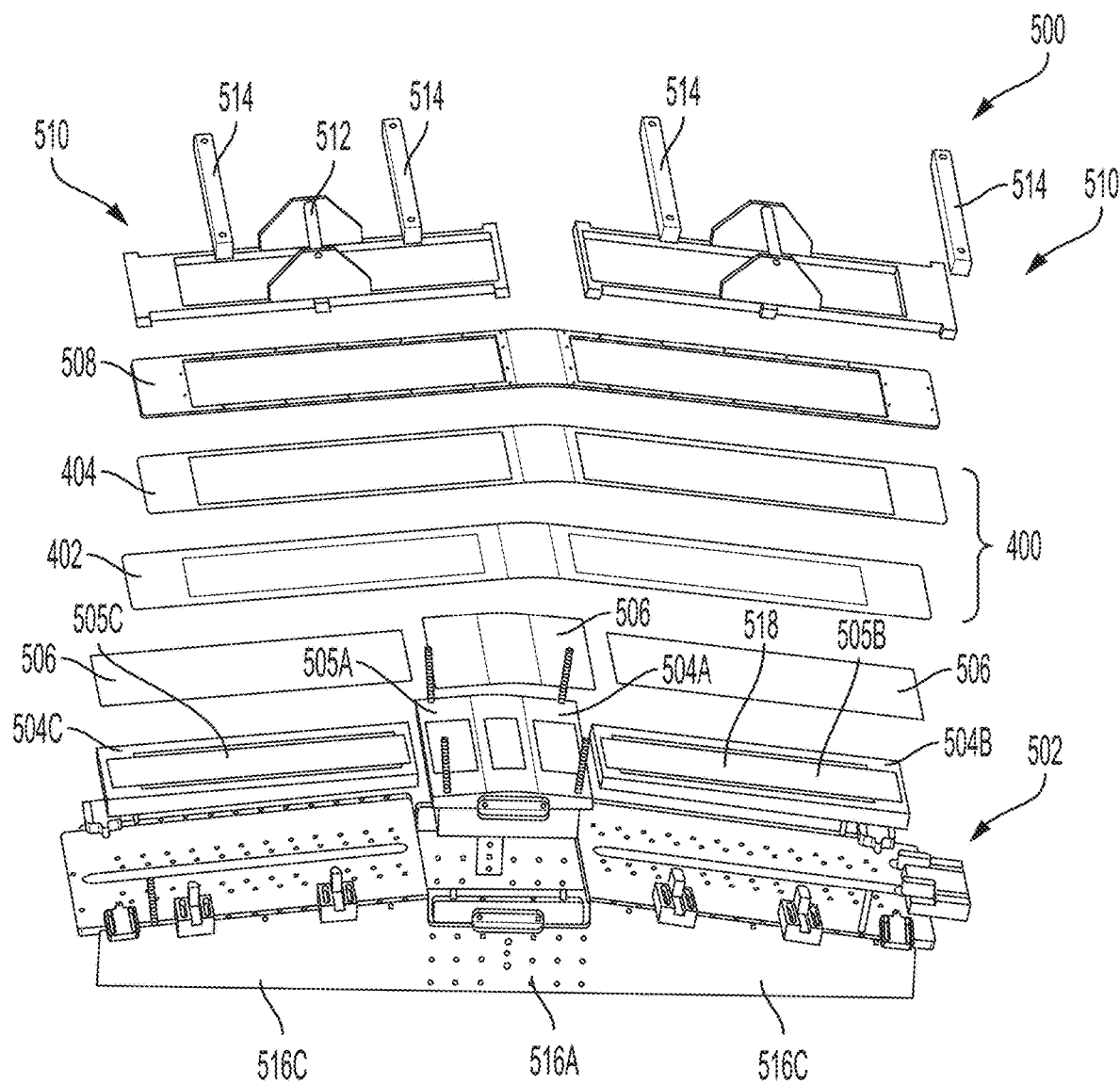

FIGS. 6A and 6B show a forming apparatus 500 comprising a vacuum forming apparatus (also called a vacuum chuck) for cold forming the glass substrate 402 as previously discussed. Other components of the display 400 are shown in FIG. 6B including the frame 404. FIG. 6A shows the forming apparatus 500 forming the display 400 via the cold forming process.

As shown best in FIG. 6B, the forming apparatus 500 can optionally include a body 502, a plurality of forming pieces 504A, 504B and 504C (also called inserts, regions, or pads), thin coating 506, first frame fixture 508 and second frame fixture assembly 510. The second frame fixture assembly 510 can include handle 512 and bars 514.

The body 502 can form or house a plurality of independent separate plenums 516A, 516B, and 516C therein these communicate with the plurality of forming pieces 504A, 504B and 504C, respectively. Alternatively, the body 502 can have just a single plenum that communicates with the plurality of forming pieces 504A, 504B and 504C. These can be used to apply independently controlled pressure differentials to the plurality of forming pieces 504A, 504B and 504C. The pressure differential applied to center or wings can be varied relative to one another. For example, the pressure differential on the wings may not be necessary for specific designs, whereas, more pressure differential may be required in the center with specific designs. The body 502 can be configured to receive the plurality of forming pieces 504A, 504B and 504C, which can be configured to be removable therefrom.

The plurality of forming pieces 504A, 504B and 504C can each have a major surface 505A, 505B and 505C designed to interface with a corresponding major surface of the glass substrate 402. The plurality of forming pieces 504A, 504B and 504C can include a removable center piece 504A that enables seem-less clamping (part does not have to be removed from clamps) between forming and clamping steps as further illustrated in FIG. 7. The removable center piece 504A can have the major surface 505A with a center of curvature as further discussed herein. The wing portions 504B and 504C can have the major surfaces 505B and 505C, respectively, which can be substantially flat for shaping the wing regions of the display 400 as previously discussed. The geometry of the apparatus 500 can also be changed such as to change the curvature thereof by simply removing the center piece 504A rather than having to remove multiple components. The plurality of forming pieces 504A, 504B and 504C can include surface features such as holes or channels 518 (best shown in FIG. 6A) configured to provide an improved pressure differential (pull down force) to the display 400, and particular the glass substrate 402 along a major surface thereof. The channels 518 may only be on the surface of the plurality of forming pieces 504A, 504B and 504C and may not penetrate to the plenums, for example. As will be further discussed in reference to FIG. 8, the frame fixtures 508, 510, and in particular the second frame fixture assembly 510 and body 502 can have a mechanical stop(s) that provides for an adjustable bond line control feature. Bars 514 and clamps of the second frame fixture assembly 510 can be configured to apply a uniform pressure down onto the display 400 via the frame 404 without the need for a large press. Frames fixture 510 with handles 512 that attach to the frame fixture 510 add rigidity and provide ease of handling.

As discussed previously, the advantages provided by the forming apparatus 500 include glass substrate 402 shaped to a targeted shape within 100 μm (as opposed to >1 mm), an improved control of bond line (e.g., +/−200 μm as opposed to >1 mm), a reduced process time (e.g., 15 min v. 2+ hours), ability to accommodate multiple designs and bond line thicknesses (e.g., simply remove center piece 504A and swap a different center piece with different geometry), and greater compatibility with multiple type of displays including laminated displays.

Figure 7:
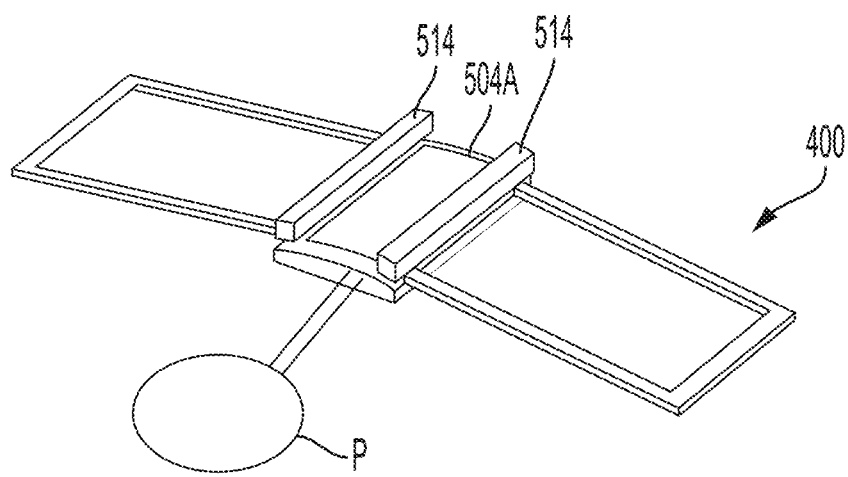
FIG. 7 illustrates a central forming block of the vacuum apparatus removed from a remainder of the apparatus and being claimed to the display during a curing process.

FIGS. 6B and 7 show the center piece 504A is removable. FIG. 7 also illustrates the display 400 can remain clamped to the center piece 504A after removal from the remainder of the forming apparatus 500 (refer to FIG. 6B). The center piece 504A can also be configured to remain connected to a low-pressure source P (such as a vacuum) when so removed as shown in FIG. 7. This enables seem-less clamping (part does not have to be removed from clamps) between forming and clamping steps.

Returning now to FIG. 6B only, the thin coating 506 can comprise a polymer coating such as Teflon tape, that is configured to provide good sealing, protection of the glass substrate 402 but is only slightly compliant to achieve good shape. According to one example, the coating 506 can be an adhesive backed polymer film having a minimal compliance. This selection offers protection from damage to glass by the metal chuck, while adequately sealing the vacuum and has minimal compliance. Use of an adhesive film is easy to apply and replace.

According to one high level example, a cold forming process using the forming apparatus 500 can entail, alignment of a piece of flat glass to the forming apparatus, vacuum or other low pressure differential is applied holding the glass to the desired shape, application of the bonding medium such as the structural adhesive to the frame or glass surface in a specified pattern, aligning and pressing the three-dimensional shaped frame to the glass on the forming apparatus, application of force to compress the adhesive to a consistent thickness (bond line thickness) and holding the frame to the glass by means of clamping, for example.

According to one embodiment, a method of forming a display 400 for mounting one or more display modules in a vehicle interior system is disclosed. The method can include positioning the glass substrate 402 on the forming apparatus 500. The forming apparatus 500 can have a plurality of forming pieces 504A, 504B, 504C each with a major surface 505A, 505B, 505C configured to interface with the glass substrate 402. The major surface 505A of at least one of the plurality of forming pieces (here 504A) has a radius of curvature. The method can include applying an air pressure differential with the forming apparatus 500 to cause the glass substrate 402 to deform and assume a shape along a major surface thereof corresponding to that of each major surface 505A, 505B, 505C of the forming apparatus 500 (specifically of the plurality of forming pieces 504A, 504B, 504C). A portion of the major surface of the glass substrate 402 deforms to have a radius of curvature corresponding with the radius of curvature of the major surface 505A of at least one of the plurality of forming pieces 504A. The method can include applying a structural adhesive (or other bonding medium as discussed herein) to one or more of a frame 404 and the glass substrate 402 and positioning the frame 404 on the glass substrate 402 with the structural adhesive positioned therebetween. The method can include applying a desired force to the frame 404 to compress the adhesive to a desired thickness. The method can include removing the glass substrate 402 from one or more of the plurality of forming pieces (here 504B and 504C) of the forming apparatus while maintaining the glass substrate 402 clamped to the at least one of the plurality of forming pieces (here 504A as shown in FIG. 7). The method can include maintaining applying the desired force to compress the adhesive to the desired thickness for a desired duration of time with the glass substrate clamped to the at least one of the plurality of forming pieces as shown in FIG. 7. The method can further include maintaining applying a pressure differential with the forming piece 504A removed while maintaining the glass substrate 402 clamped to the at least one of the plurality of forming pieces (here 504A). The method can include applying the air pressure differential with the forming apparatus includes applying a different amount of the air pressure differential for one or more of the plurality of forming pieces 504A, 504B and 504C.

Conventional processes require the glass and frame to be clamped on the vacuum chuck for the entire time while the adhesive is curing. Releasing the clamp prior to the adhesive setting up/achieving sufficient strength results in glass changing shape or even delaminating from the frame in high stress regions. It is also undesirable to have motion of the components (glass & frame) while the adhesive is curing.

One aspect of this invention is that it allows the display 400 to be removed from the vacuum chuck prior to the adhesive reaching full cure because the clamping (via bars 514) and/or pressure differential P can be continuously maintained as illustrated in embodiment of FIG. 7. As shown in FIG. 7, clamping capability is a bar/threaded rod combination (using two of the bars 514 previously shown in FIGS. 6A and 6B) across the portion of the curve where the glass substrate 402 stress is highest (e.g., a flat region where the curve transitions to substantially flat referred to as the flat tip region herein). Mechanical stops (similar to those discussed further below in reference to FIG. 8) can also be included with the center piece 504A and other components including bars 514 of FIG. 7 to prevent over-tightening of the bar clamp(s). With this construct, the display 400 can be formed on the vacuum chuck and removed prior to full adhesive cure. Additional center piece 504A may be required for each additional display part in process, but this provides for more rapid throughput and alternative design curvatures as benefits.

Figure 8:
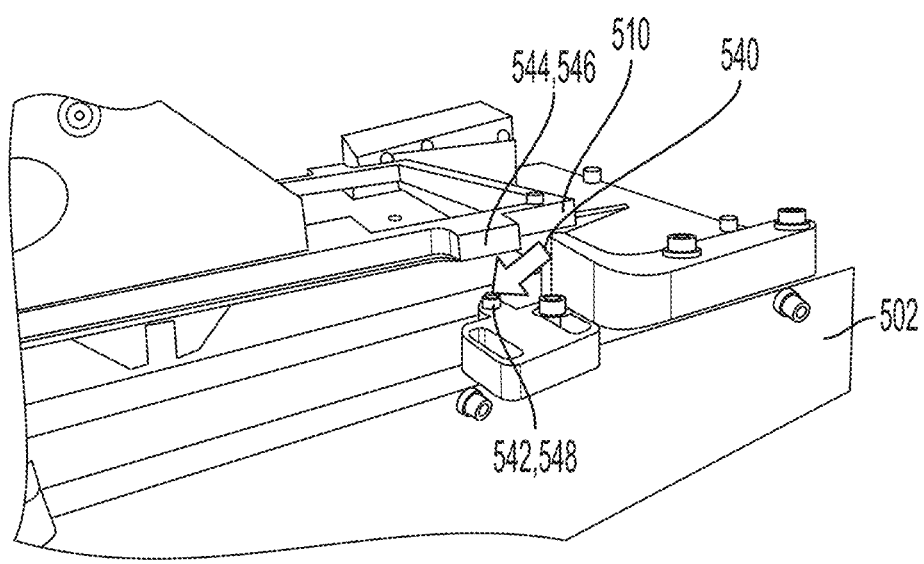
FIG. 8 illustrates interaction of the frame overhangs with bond line features to create a mechanical hard stop to set the adhesive bond thickness. A set screw or other mechanism can be adjusted to meet a specific bond line target and be adjusted to reduce variability.

As shown in FIG. 8, the body 502 and the second frame fixture assembly 510 can form a mechanical stop 540. The mechanical stop 540 can comprise a position adjustable feature 542 (such as a screw, set screw, etc.) of the body 502 and a portion 544 of the second frame fixture assembly 510 that clamps down the frame 404. Thus, the desired thickness of the bond line (bonding medium) varies between +/−200 µm as a result of the mechanical stop 540. More particularly, the second frame fixture assembly 510 can include overhangs or wings 546 (portion 544) that interact with a respective set screw 548 (position adjustable feature 542) to create the mechanical stop 540 to set the adhesive bond thickness. The set screw 544 can be adjusted to meet a specific bond line target and can be adjusted to reduce bond line variability. Multiple set screws can be provided for each side of the forming apparatus 500.

Figure 9:
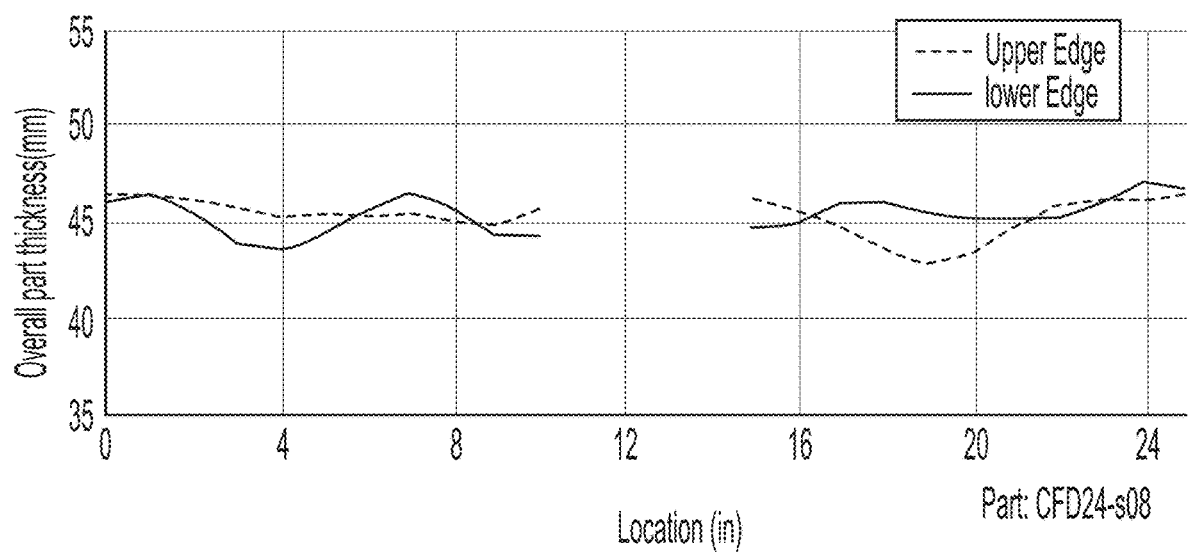
FIG. 9 show a bond line uniformity in portions of the display.

FIG. 9 shows the bonding medium can have a thickness between the glass and the frame that varies between +/−200 µm or 10% of a desired thickness, whichever is less. This is a direct result of the forming apparatus 500 for forming the display 400 including the mechanical stops as discussed with reference to FIGS. 7 and 8.

Additional methods or product features contemplated herein include localized heating/curing of specific regions of the adhesive using conductive or radiation-based methods. Specific regions include those where compression and tensile stresses are maximum such as the flat tip and central region. Local heating could be used to 'tack' down specific regions. Example of application include use of a pre-heated curved center insert, cartridge heaters, IR radiation. The specific regions contemplated include those where the glass substrate applies compressive stresses to the bonding medium or tensile stresses to the bonding medium, for example.

Aspect (1) of this disclosure pertains to an apparatus for housing a plurality of display modules within a vehicle interior system, comprising: a frame having a curved central portion, a first wing portion connected to a first side of the central portion and defining a first opening configured to receive a one of the plurality of display modules therein, and a second wing portion connected to an opposing second side of the central portion and defining a second opening configured to receive a second of the plurality of display modules therein; a glass substrate positioned on the frame and including a curved central portion interfacing with the curved central portion of the frame, a first wing portion interfacing with the first wing portion of the frame and covering the first opening, and a second wing portion interfacing with the second wing portion of the frame and covering the second opening; and a bonding medium attaching the glass to the frame, wherein the bonding medium has a thickness between the glass and the frame that varies between +/−200 µm or 10% of a desired thickness, whichever is less.

Aspect (2) of this disclosure pertains to the apparatus of Aspect (1), wherein one or more of the first wing portion of the glass, the first wing portion of the frame, the second wing portion of the glass and the second wing portion of the frame each have at least one surface that is substantially flat with a curvature that varies by one of +/−0.250 units of Diopter, +/−0.150; Diopter and +/−0.100 Diopter.

Aspect (3) of this disclosure pertains to the apparatus of Aspect (1) or Aspect (2), wherein the curved central portion of the glass substrate has a radius of curvature that is within 100 µm of a radius of curvature of the curved central portion of the frame.

Aspect (4) of this disclosure pertains to the apparatus of any one of Aspects (1) through (3), wherein one or more of the curved central portion of the frame and the curved central portion of the glass substrate each have a radius of curvature of 20 mm but less than 500 mm.

Aspect (5) of this disclosure pertains to the apparatus of any one of Aspects (1) through (4), wherein the frame has an interior surface that defines the first opening and a second interior edge defines the second opening, and wherein the first interior surface provides mechanical alignment for positioning the first of the plurality of display modules within the first opening and the second interior surface provides mechanical alignment for positioning the second of the plurality of display modules within the second opening.

Aspect (6) of this disclosure pertains to the apparatus of any one of Aspects (1) through (5), wherein the bonding medium comprises a structural adhesive.

Aspect (7) of this disclosure pertains to the apparatus of any one of Aspects (1) through (6), further comprising a spacer positioned between the frame and the glass substrate and positioned adjacent the bonding medium.

Aspect (8) of this disclosure pertains to the apparatus of Aspect (7), wherein the spacer comprises one or more of VHB tape, foam tape, rigid polymer, compliant polymer or fully or partially cured structural adhesive.

Aspect (9) of this disclosure pertains to the apparatus of Aspect (7) or Aspect (8), wherein the frame can have one or more features configured to improve alignment or performance of the spacer.

Aspect (10) of this disclosure pertains to an apparatus for housing a plurality of display modules within an interior of a vehicle, comprising: a frame having a curved central portion and configured to house at least one of the plurality of display modules therein; a glass substrate attached to and positioned on the frame and including a curved central portion interfacing with the curved central portion of the frame, wherein the curved central portion of the glass substrate has a radius of curvature that is within 100 µm of a radius of curvature of the curved central portion of the frame.

Aspect (11) of this disclosure pertains to the apparatus of Aspect (10), wherein the frame further comprises: a first wing portion connected to a first side of the central portion and defining a first opening configured to receive one of the plurality of display modules therein, and a second wing portion connected to an opposing second side of the central portion and defining a second opening configured to receive another of the plurality of display modules therein.

Aspect (12) of this disclosure pertains to the apparatus of Aspect (11), wherein the glass substrate further comprises: a first wing portion interfacing with the first wing portion of the frame and covering the first opening, and a second wing portion interfacing with the second wing portion of the frame and covering the second opening.

Aspect (13) of this disclosure pertains to the apparatus of Aspect (12), wherein one or more of the first wing portion of the glass, the first wing portion of the frame, the second wing portion of the glass and the second wing portion of the frame each have at least one surface that is substantially flat with a curvature that varies by +/−0.250 units of diopter.

Aspect (14) of this disclosure pertains to the apparatus of any one of Aspects (10) through (13), wherein the glass is attached to the frame by a bonding medium, and wherein the bonding medium has a thickness between the glass and the frame that varies between +/−200 µm of a desired thickness.

Aspect (15) pertains to a method of forming a display for mounting one or more display modules in a vehicle interior system, the method comprising: positioning a glass substrate on a forming apparatus, wherein the forming apparatus has a plurality of forming pieces each with a major surface configured to interface with the glass substrate, wherein the major surface of at least one of the plurality of forming pieces has a radius of curvature; applying an air pressure differential with the forming apparatus to cause the glass substrate to deform and assume a shape along a major surface thereof corresponding to that of each major surface of the forming apparatus, wherein a portion of the major surface of the glass substrate deforms to have a radius of curvature corresponding with the radius of curvature of the major surface at least one of the plurality of forming pieces; applying a structural adhesive to one or more of a frame and the glass substrate; positioning the frame on the glass substrate with the structural adhesive positioned therebetween; applying a desired force to the frame to compress the adhesive to a desired thickness; removing the glass substrate from one or more of the plurality of forming pieces of the forming apparatus while maintaining the glass substrate clamped to the at least one of the plurality of forming pieces; and maintaining applying the desired force to compress the adhesive to the desired thickness for a desired duration of time with the glass substrate clamped to the at least one of the plurality of forming pieces and with the glass substrate removed from one or more of the plurality of forming pieces of the forming apparatus.

Aspect (16) pertains to the method of Aspect (15), wherein the plurality of forming pieces includes a central forming piece that comprises the at least one of the plurality of forming pieces with the major surface with the radius of curvature.

Aspect (17) pertains to the method of Aspect (16), wherein the plurality of forming pieces further includes a first wing piece with the major surface thereof that is substantially flat and a second wing piece with the major surface thereof that is substantially flat.

Aspect (18) pertains to the method of any one of Aspects (15) through (17), wherein the applying the desired force to the frame to compress the adhesive to the desired thickness is controlled by a mechanical stop.

Aspect (19) pertains to the method of Aspect (18), wherein the mechanical stop comprises a position adjustable feature of the forming apparatus and a portion of a fixture that clamps down the frame.

Aspect (20) pertains to the method of any one of Aspects (18) through (19), wherein the desired thickness varies between +/−200 µm as a result of the mechanical stop.

Aspect (21) pertains to the method of any one of Aspects (15) through (20), wherein the radius of curvature of the glass substrate is within 100 µm of the radius of curvature of the major surface at least one of the plurality of forming pieces.

Aspect (22) pertains to the method of any one of Aspects (15) through (20), wherein applying the air pressure differential with the forming apparatus includes applying a different amount of the air pressure differential for one or more of the plurality of forming pieces.

Aspect (23) pertains to the method of any one of Aspects (15) through (22), wherein the major surface of the forming apparatus defines a plurality of channels that communicate with the glass substrate to allow for applying the air pressure differential.

Aspect (24) pertains to the method of any one of Aspects (15) through (23), further comprising accelerating curing of the structural adhesive in selective regions.

Aspect (25) pertains to the method of any one of Aspects (15) through (24), further comprising maintaining applying the air pressure differential with the glass substrate clamped to the at least one of the plurality of forming pieces and with the glass substrate removed from one or more of the plurality of forming pieces of the forming apparatus.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The present disclosure provides for the following embodiments, the numbering of which is not to be construed as designating levels of importance:

What is claimed is:

1. An apparatus for housing a plurality of display modules within a vehicle interior system, comprising:
    a frame having a curved central portion, a first wing portion connected to a first side of the curved central portion and defining a first opening configured to receive a first one of the plurality of display modules therein, and a second wing portion connected to an opposing second side of the curved central portion and defining a second opening configured to receive a second one of the plurality of display modules therein;
    a glass substrate positioned on the frame and including a curved central portion interfacing with the curved central portion of the frame, a first wing portion interfacing with the first wing portion of the frame and covering the first opening, and a second wing portion interfacing with the second wing portion of the frame and covering the second opening; and
    a bonding medium attaching the glass substrate to the frame, wherein the bonding medium has a thickness between the glass substrate and the frame that varies by less than 400 µm, wherein one or more of the first wing portion of the glass substrate, the first wing portion of the frame, the second wing portion of the glass substrate and the second wing portion of the frame each have at least one surface that is substantially flat with a curvature that varies by less than or equal to 0.250 units of Diopter in magnitude.

2. The apparatus of claim 1, wherein the first wing portion of the glass substrate and the second wing portion of the glass substrate each have at least one major surface that is substantially flat with a curvature that varies by less than or equal to 0.100 Diopter in magnitude.

3. The apparatus of claim 1, wherein the curved central portion of the glass substrate has a radius of curvature that is within 100 µm of a radius of curvature of the curved central portion of the frame.

4. The apparatus of claim 1, wherein one or more of the curved central portion of the frame and the curved central portion of the glass substrate each have a radius of curvature of at least 20 mm but less than 2000 mm.

5. The apparatus of claim 1, wherein the bonding medium comprises a structural adhesive.

6. The apparatus of claim 1, further comprising a spacer positioned between the frame and the glass substrate and positioned adjacent the bonding medium.

7. The apparatus of claim 6, wherein the spacer comprises one or more of VHB tape, foam tape, rigid polymer, compliant polymer or fully or partially cured structural adhesive.

8. An apparatus for housing a plurality of display modules within an interior of a vehicle, comprising:
    a frame having a curved central portion and configured to house at least one of the plurality of display modules therein;
    a glass substrate attached to and positioned on the frame and including a curved central portion interfacing with the curved central portion of the frame, wherein the curved central portion of the glass substrate has a radius of curvature that is within 100 µm of a radius of curvature of the curved central portion of the frame,
    wherein the frame further comprises:
        a first wing portion connected to a first side of the central portion and defining a first opening configured to receive one of the plurality of display modules therein, and
        a second wing portion connected to an opposing second side of the central portion and defining a second opening configured to receive another of the plurality of display modules therein,
    wherein the glass substrate further comprises:
        a first wing portion interfacing with the first wing portion of the frame and covering the first opening, and
        a second wing portion interfacing with the second wing portion of the frame and covering the second opening,
        wherein the first wing portion of the glass substrate and the second wing portion of the glass substrate each have at least one major surface that is substantially flat with a curvature that varies by less than or equal to 0.150 Diopter in magnitude.

9. The apparatus of claim 8, wherein the glass substrate is attached to the frame by a bonding medium, and wherein the bonding medium has a thickness between the glass substrate and the frame that varies by less than 400 µm.

10. A method of forming a display for mounting one or more display modules in a vehicle interior system, the method comprising:
    positioning a glass substrate on a forming apparatus, wherein the forming apparatus has a plurality of forming pieces each with a major surface configured to interface with the glass substrate, wherein the major surface of at least one of the plurality of forming pieces has a radius of curvature;

applying an air pressure differential with the forming apparatus to cause the glass substrate to deform and assume a shape along a major surface thereof corresponding to that of each major surface of the forming apparatus, wherein a portion of the major surface of the glass substrate deforms to have a radius of curvature corresponding with the radius of curvature of the major surface at least one of the plurality of forming pieces;

applying a structural adhesive to one or more of a frame and the glass substrate;

positioning the frame on the glass substrate with the structural adhesive positioned therebetween;

applying a desired force to the frame to compress the structural adhesive to a desired thickness; removing the glass substrate from one or more of the plurality of forming pieces of the forming apparatus while maintaining the glass substrate clamped to the at least one of the plurality of forming pieces; and maintaining applying the desired force to compress the structural adhesive to the desired thickness for a desired duration of time with the glass substrate clamped to the at least one of the plurality of forming pieces and with the glass substrate removed from one or more of the plurality of forming pieces of the forming apparatus.

11. The method of claim 10, wherein the plurality of forming pieces includes a central forming piece that comprises the at least one of the plurality of forming pieces with the major surface with the radius of curvature.

12. The method of claim 11, wherein the plurality of forming pieces further includes a first wing piece with the major surface thereof that is substantially flat and a second wing piece with the major surface thereof that is substantially flat.

13. The method of claim 10, wherein the applying the desired force to the frame to compress the adhesive to the desired thickness is controlled by a mechanical stop.

14. The method of claim 10, wherein applying the air pressure differential with the forming apparatus includes applying a different amount of the air pressure differential for one or more of the plurality of forming pieces.

15. The method of claim 10, wherein the major surface of the forming apparatus defines a plurality of channels that communicate with the glass substrate to allow for applying the air pressure differential.

* * * * *